US008257036B2

(12) United States Patent
Norris

(10) Patent No.: US 8,257,036 B2
(45) Date of Patent: Sep. 4, 2012

(54) EXTERNALLY MOUNTED VORTEX GENERATORS FOR FLOW DUCT PASSAGE

(76) Inventor: Thomas R. Norris, Orinda, CA (US)

( * ) Notice: Subject to any disclaimer, the term of this patent is extended or adjusted under 35 U.S.C. 154(b) by 1187 days.

(21) Appl. No.: 11/547,527

(22) PCT Filed: Apr. 6, 2005

(86) PCT No.: PCT/US2005/011645
§ 371 (c)(1),
(2), (4) Date: Nov. 9, 2007

(87) PCT Pub. No.: WO2005/100752
PCT Pub. Date: Oct. 27, 2005

(65) Prior Publication Data
US 2008/0121301 A1 May 29, 2008

Related U.S. Application Data

(60) Provisional application No. 60/560,951, filed on Apr. 9, 2004.

(51) Int. Cl.
*F04D 29/68* (2006.01)
(52) U.S. Cl. ..................... 415/208.2; 415/914
(58) Field of Classification Search .............. 415/191, 415/193, 199.5, 208.2, 209.1, 211.2, 914, 415/142
See application file for complete search history.

(56) References Cited

U.S. PATENT DOCUMENTS

| | | | |
|---|---|---|---|
| 2,558,816 A | 7/1951 | Bruynes | |
| 2,650,752 A | 9/1953 | Hoadley | |
| 2,798,661 A | 7/1957 | Willenbrock, Jr. et al. | |
| 2,844,001 A | 7/1958 | Alford | |
| 3,193,185 A | 7/1965 | Erwing et al. | |
| 3,879,939 A | 4/1975 | Markowski | |
| 4,023,350 A | 5/1977 | Hovan et al. | |
| 4,215,536 A * | 8/1980 | Rudolph | 60/262 |
| 4,217,756 A * | 8/1980 | Laskody | 60/262 |
| 4,298,089 A * | 11/1981 | Birch et al. | 181/213 |
| 4,655,419 A | 4/1987 | Van der Hoeven | |
| 4,830,315 A * | 5/1989 | Presz et al. | 244/200 |
| 4,971,768 A | 11/1990 | Ealba et al. | |
| 6,502,383 B1 * | 1/2003 | Janardan et al. | 60/226.1 |
| 6,905,303 B2 * | 6/2005 | Liu et al. | 415/142 |

* cited by examiner

*Primary Examiner* — Nathaniel Wiehe
(74) *Attorney, Agent, or Firm* — Kilpatrick Townsend & Stockton LLP

(57) ABSTRACT

A high drag vortex generator for inhibiting the formation of boundary layer gas flow is mounted in a duct having a strong adverse pressure gradient with high speed gas flow over a primary aerodynamic. The vortex generator includes a mounting for supporting the high drag vortex generator at a spatial interval in the high speed gas flow above the primary aerodynamic surface. The high drag vortex generator is supported from the mounting and extends from the mounting in the high speed gas flow less than the full distance to the primary aerodynamic surface. Each high drag vortex generator includes first and second vanes. The first and second vanes have flow confining components at substantial right angles to one another. The vanes flow confining components deflect fluid flow towards and/or away from the primary aerodynamic surface inhibiting boundary layer formation downstream of the vortex generator.

23 Claims, 18 Drawing Sheets

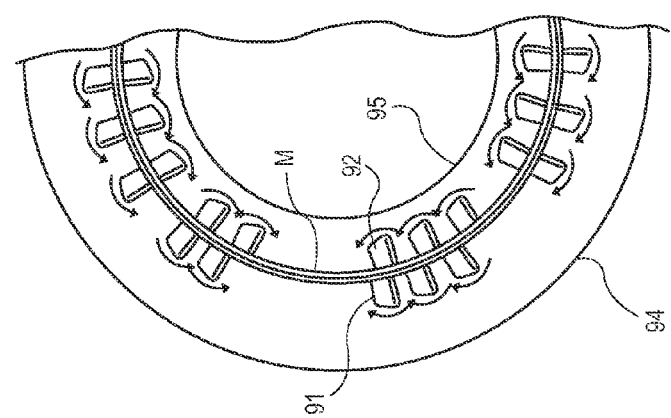
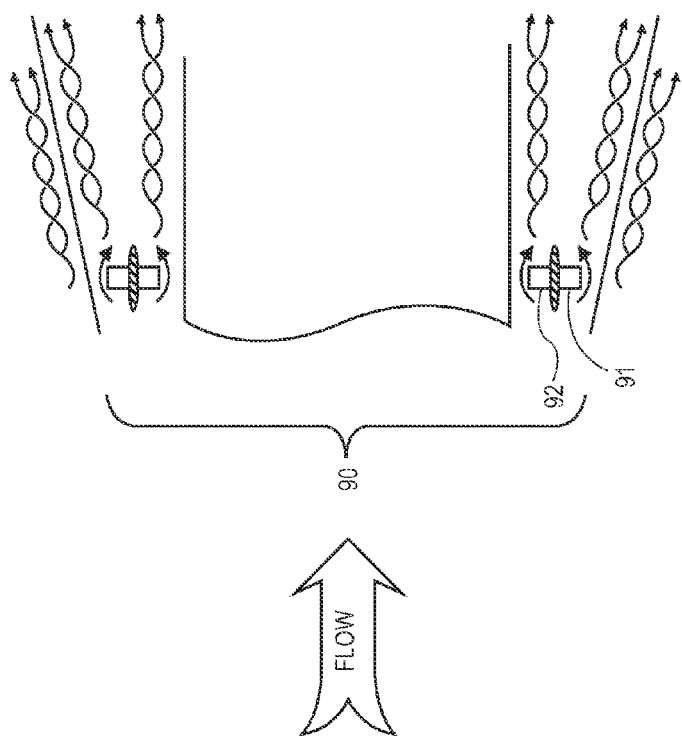
FIG. 13A
FIG. 13B

EXTERNALLY MOUNTED VORTEX GENERATORS FOR FLOW DUCT PASSAGE

CROSS-REFERENCES TO RELATED APPLICATIONS

This application claims the benefit of US Provisional Patent Application entitled Externally Mounted Vortex Generators with Diffuser Flow Duct Passages filed by Thomas R. Norris as Ser. No. 60/560,951 on Apr. 9, 2004.

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK

NOT APPLICABLE

This invention relates to vortex generators for improving flow over an aerodynamic surface using an improved vortex generator system. More particularly the improved vortex generators improve flow in zones that include unusually strong adverse pressure gradients and/or thick unstable boundary layers.

The disclosed vortex generator set is positioned a short distance away from the aerodynamic surface. At this distance, the vortex generator system is expected to be out of the low energy boundary layer or any accumulations of stalled gas. The vortex generator system is ideal to improve flow internal to ducts that include wide angle and high area ratio diffusers, particularly in turbomachines; the back ends of sharply tapered annular diffuser center cones or other center body shape; or ducts having turns.

BACKGROUND OF THE INVENTION

It is well known that vortex generators can improve flow over an aerodynamic surface by energizing the boundary layer at the aerodynamic surface. The aerodynamic surface defines a flow boundary, and thus dynamically guides flow, such as a duct wall or aircraft surface.

The vortex generators provide a swirling flow mixing action that trails downstream of the vortex generator. Small vortex generator vanes are commonly seen on the upper, suction surfaces of wings of commercial aircraft. Vortex generators are commonly used in sets across an aerodynamic surface, such as a row across a wing, or around the interior of a duct having a bend with a low-angle diffuser.

In this disclosure, the term "vortex generator" refers to a flow mixing device placed on or adjacent to an aerodynamic surface with the objective of preventing flow separation between high speed stream flow and the boundary layer, which can be stall gas.

In the technical literature and some patents relating to burners, there is also mention of a vortex generator. The vortex generator in this case a very different device with a different objective. The burner vortex generator is a very high drag baffle plate oriented directly across the flow, in essence a multi-nozzle device with substantial solidity which squirts flow into a spiral. This device, having high solidity, severely restricts flow as well as developing an intense swirl necessary for proper burner flame holding and burner function. This is a totally different device than the vortex generators discussed in this patent, although in American English and American industrial practice, the name is unfortunately the same as the topic of this patent.

Many types of vortex generators for boundary layer control have been devised. The most widely used vortex generator consists of a relatively small vane extending a short distance out from a much larger aerodynamic surface. In the usual case, the chord of the vane (line drawn between the vane leading and trailing edge) extends at a slight angle to the direction of flow expected during aircraft flight conditions where a flow separation might occur if the vortex generator was not present. These simple vortex generators are economical, have well-known performance characteristics, and are all combined with exceptionally low drag. They are suited for improving flow in relatively weak adverse pressure gradients. However, being of small size and fastened directly to the aerodynamic surface, these vortex generators can become wholly immersed in a thickened boundary layer or stalled flow accumulations, resulting in ineffectiveness. They must thus be placed where energetic free stream flow will be dependably incident against the aerodynamic surface, which usually is well upstream of where the benefit of their increased flow mixing is desired. Despite these severe limitations, the advantages are insurmountable in many weak adverse pressure gradient applications. No other vortex generator type is in as wide use.

Many other types of vortex generators have been devised and tested. A classic discussion of experiments and data appears in G. B. Schubauer and W. G. Spanberg: "Forced Mixing in Boundary Layers," Journal of Fluid Mechanics, 8 (1960). Both authors were with the U.S. National Bureau of Standards. Maintaining low drag is a major concern in this study.

An excellent introduction to diffusers may be found in "The Design of High Efficiency Turbomachinery and Gas Turbines," Chapter 4, by David Gordon Wilson, The MIT Press, Cambridge, Mass., Third Printing, 1988.

A review of some U.S. patents concerning vortex generators follows:

Van der Hoeven in U.S. Pat. No. 4,655,419 "Vortex Generator" (1984) describes a vortex generator vane size relative to the boundary layer thickness, shape, and application of a curved row of vortex generating vanes to a particular jetliner aircraft wing geometry.

Bruynes, in a historic vortex generator patent, U.S. Pat. No. 2,558,816, "Fluid Mixing Device" (1947) discloses vanes similar to the van der Hoeven vortex generators, applied to improve flow in ducts, fans, diffusers, and wind tunnels. These vanes begin on a wall of the diffuser where boundary layer or stall gas is present. Vanes in diffusers have minimal effect if placed within such areas where rapidly thickening boundary layers are present. Specifically, the direction of gas flow is not always possible to ascertain in boundary layers; thus the direction of vane alignment cannot be properly chosen.

Hoadly in U.S. Pat. No. 2,650,752 "Boundary Layer Control in Blowers" (1949) discloses several types of vortex generator vanes installed in fans, on struts in ducts, diffusers, and on aircraft wings and control surfaces. In particular T-shaped vortex generators are disclosed, which T-shaped vortex generators do not have toward and away wall fluid diverting components.

Alford in U.S. Pat. No. 2,844,001 "Flow Straightening Vanes for Diffuser Passages" (1953) discloses in a turbojet outlet annulus and duct various vanes whose length is a partial passage width. These vanes straighten flow to recover swirl energy to increase thrust, and also induce vortices.

Birch in U.S. Pat. No. 4,298,089 "Vortex Generators for Internal Mixing in a Turbofan Engine" (1979) discloses vortex generators stated to reduce mixing noise of two separate flows as they merge, one cold flow from the fan and the other hot flow from the core engine. The vortex generators are mounted at the back of the core engine nozzle rim just upstream of the point of the flow confluence.

Laskody in U.S. Pat. No. 4,217,756 "Vortex Mixers for Reducing the Noise Emitted by Jet Engines" (1977) discloses stacked airfoils mounted on a radial spine that attempted to mix a hot core and cold annular flow within a nozzle. These are located just downstream of the confluence of the two streams, all in a quest for lower noise.

Ealba in U.S. Pat. No. 4,971,768 "Diffuser with Convoluted Vortex Generator" discloses a circumferential strip with, for vortex generation, a convoluted downstream edge. The application is in a pipe leading toward a diffuser.

I have experimented with this specific shape of diffuser. I have found that the convoluted downstream edge causes deflection along the circumference of the convoluted downstream edge; it does not cause efficient deflection towards and away from the diffuser walls so as to have an efficient effect on boundary layers downstream of the disclosed diffuser.

In what follows, I describe a vortex generator system that is especially useful on an aerodynamic surface that includes along its length a strongly adverse pressure gradient, such as a diffusing flow passage. A diffusing flow passage is one in which the pressure gradient increases in the direction of flow. Examples of a diffusing flow passage in a turbomachine are those diffusers found downstream of blade sections, near and in combustors, between or within compressor blade sections, and the flow path through an axial or radial compressor. Portions of turns or bends may be diffusing. In some diffusing flow passages, there may be sections where the static pressure locally stays the same or decreases in the direction of flow. However, in the diffusing flow passages here considered, for the duct as a whole, the static pressure increases in the direction of flow.

In the following discussion about diffusing flow passages, the term coefficient of pressure rise, or Cpr, is defined as:

Cpr=static pressure rise through the diffuser/dynamic pressure at the low pressure location of reference.

This low pressure reference is usually chosen at the diffuser smallest area or the diffuser inlet. The Cpr is always between 0 and 1.

The "diffuser effectiveness" is defined as the actual static pressure rise in the diffuser divided by the static pressure rise that would ideally occur in the absence of any flow losses for the duct area change of the diffuser. The diffuser effectiveness is also always between 0 and 1, but is always greater than the Cpr.

Discovery

I have discovered that the proper introduction of comparatively high drag vortex generators inhibits flow separations in areas of strong adverse pressure gradient on an aerodynamic surface where flow separations would otherwise occur. Particularly, in compact diffusers with an effectiveness of up to about 0.90, the high drag vortex generators can produce a net improvement in flow efficiency for a given diffuser area ratio, despite the high drag. This result appears to be counterintuitive and unexpected, given the high drag penalty of the vortex generator itself.

"Strong adverse pressure gradient" is defined in this application as a decelerating flow within a duct sufficient to produce losses within the incoming flow of kinetic energy of the gas exceeding 10%. Such pressure gradients are commonly found in diffusers having divergences exceeding 8° with area ratios (Outlet/Inlet) exceeding 1.75.

A "high drag vortex generator system" is a device for exchanging momentum between high speed flow and slow boundary layer flow in the high speed or free stream gas flow found away from the walls of a flow passage or the walls of a duct with a strong adverse pressure gradient. "High drag vortex generator" is defined as a vortex generators placed in a diffuser with at least one vane of each vortex generator substantially within the free stream with an effectiveness no greater than 0.90. Most of these high drag vortex generators will be in the form of intersecting vanes, often cruciform or ladder shaped.

"Free stream" or "high speed gas flow" is defined in this application as that portion of the gas flowing between a duct wall and the central portion of a duct that has a speed of 0.65 or greater than the average speed across the duct.

A "turbomachine with high speed gas flow" is defined for this patent as a gas flow housing or duct enclosing a spinning, dynamically acting impeller, that produces or consumes power, and a maximum gas velocity averaged through any plane across the flow through the machine with a bladed section of at least Mach 0.10 or a pressure ratio of highest pressure divided by lowest pressure of at least 1.1.

In the disclosure that follows, certain of my high drag vortex generator systems in diffusers appear similar to or are identical with low drag vortex generator systems in diffusers utilized in the prior art. It will be understood that in these instances, the prior art never considered the placement of these vortex generators in diffusers having a high drag environment with strong adverse pressure gradients.

In so far as the prior art does not disclose this type of high drag vortex generator alone or in a system in the turbomachinery environment, invention is claimed.

Further Background

In addition, a higher area ratio is made possible per given length of diffuser utilized. It is well known that diffusers with small included angles between walls, about 6 to 7 degrees, produce the highest effectiveness of all, but are rarely feasible because of their excessive length. Thus, the vortex generators of this invention will see most application to improving diffusers of the usual case, with their larger angles of 8 degrees and over, and accompanying high adverse pressure gradients.

Stated in other terms, the ratio between inlet and outlet on conventional diffusers seldom exceeds 1 to 2.5 or 2.6. In utilizing some of the following constructions of this disclosure, I am able to exceed these limits and approach ratios in the range of 1 to 3.0.

It is to be understood that the vortex generator of this invention differs from those vortex generator vanes of conventional design and that are commonly affixed to the wings of aircraft in at least three respects.

First, wings normally operate with relatively high efficiency aerodynamic surfaces. These high efficiency aerodynamic surfaces have relatively thin boundary layers and only mild adverse pressure gradients on the aft portions of wings and similar aerodynamic surfaces on aircraft tails. In passing through the air, such wings may have loss coefficients of just 1 or 2 percent at low angle of attack, excluding drag used to create lift. Diffusers do not include high efficiency aerodynamic surfaces.

Second, the range of flow direction of the boundary layer flow is predictable during normal flight. This is to be contrasted with turbomachines having diffusing flow passages and their sometimes the thick boundary layers and potentially unstable accumulations of boundary layers gases, in which direction of flow can be more than 45 degrees to the direction of free stream flow, often in varying and unpredictable angles.

Third, such vortex generators are fastened directly to the aerodynamic surface and are typically within a distance from the aerodynamic surface of less than 3 percent of the length, or chord, of the aerodynamic surface. This is to be distinguished from the device herein described. I attach the vortex generator vanes to a mount distanced from the aerodynamic surface that positions the vortex generator vanes at a spatial separation from the aerodynamic surface.

Fourth, conventional vortex generators usually have the junction of the vanes and mounting, and all or a substantial part of their surface area, within the low velocity boundary layer. In the low velocity boundary area, such vortex generators are low drag. My high drag vortex generator system has reduced surface area in the boundary layer, and the attachment of vanes to their mounting at a distance from the wall in the high velocity area or free stream area. This is an advantage if the boundary layer is unstable or if boundary layer flow direction is uncertain or variable.

Fifth, conventional vortex generators do not have structure and vanes with multiple or structurally redundant attachments to the flow passage walls or structure. The high drag vortex generators of this invention do.

Sixth, the high drag vortex generators may enclose the area through which the gas flows. Conventional vortex generators do not.

Most importantly, the vortex generator of my invention is not foreseen as suited to be mounted onto any substantial span of the wing of an aircraft, replacing conventional vortex generators in the usual case, because of high drag, weight, and complexity.

BRIEF SUMMARY OF THE INVENTION

In a turbomachine with a high speed gas flow section having a strong adverse pressure gradient with high speed free stream gas flow over a primary aerodynamic surface for confining the high speed gas flow, a high drag vortex generator for inhibiting the formation of boundary layer gas flow is mounted. The high drag vortex generator includes a mounting for supporting the high drag vortex generator at a spatial interval in the high speed gas flow above the primary aerodynamic surface confining duct flow. The high drag vortex generator is supported from the mounting and extends from the mount in the high speed gas flow equal to or less than the full distance to the primary aerodynamic surface confining diffuser flow. Each high drag vortex generator includes first vanes and second vanes, in which either the first and second vanes can be the mount. The first vanes have first flow confining components and the second vanes have second flow confining components at substantial right angles with respect to the first flow confining components of the first vanes. The first vane flow confining components deflect fluid flow from the free stream gas flow towards and/or away from the primary aerodynamic surface. The flow confining components of the second vane maintain the deflected fluid flow along a path towards and/or away from the primary aerodynamic surface. The second vanes flow confining components prevent the excessive sideways deflection parallel to the primary aerodynamic surface, enabling penetration through undeflected free stream gas flow. This enables boundary layer formation downstream from the vortex generator to be inhibited by mixture of the deflected free stream gas flow into the volume adjacent the primary aerodynamic surface where the boundary layers might otherwise thicken excessively or accumulate.

The flow confining components of the vanes are sufficiently adjacent one another to prevent appreciable sideways displacements parallel to the primary aerodynamic surface and to confine the displaced free stream high speed gas flow with a path leading towards and/or away from the primary aerodynamic surface. Normally, this is determined emphirically.

The preferred mounting for the disclosed vortex generator is a parallel or U-shaped mounting. The preferred form of the disclosed vortex generator system is linked "U" shaped elements, in turn positioned by narrow rods, tubes, or aerodynamic shapes attached as required to the aerodynamic surface, an adjacent duct wall, or an opposite duct wall. The attachment point of these rods, tubes, or aerodynamic shapes may be upstream, downstream, or even with the high drag vortex generator system. If appropriate, positioning structure may be anchored to a turbomachine structural element.

Optimum placement of the vane members may have to be determined by experiment, so that positioning members do not produce excessive wakes, particularly at the aerodynamic surface, that initiate stalls or unavoidable large wakes that grow in the downstream direction.

The high drag vortex generator system diverts portions of the flow and may also assist in changing the average direction of flow. If the entire flow in a duct is diverted, in effect, the high drag vortex generators act in place of turning vanes, but of course, with some portions of flow diverted more than others. Uses of the high drag vortex generator system include increasing or reducing swirl angle, or turning the flow through a bend in a duct, or aiding flow in conforming to curves in a duct wall, such as a change in wall taper angle or radius in an annular duct, or a bend in a rectangular or square exhaust duct. In these cases, the curved elements of the high drag vortex generator will in general approximately trace the intended average curvature of the flow, plus or minus the diversion angles of the individual elements.

A preferred placement of the vortex generator can be in a duct having high speed free stream gas flow over a primary aerodynamic surface for confining the high speed gas flow and having the formation of a boundary layer between the primary aerodynamic surface of the duct and the free stream gas flow. Preferably the duct would be a diffuser having a divergence exceeding 8° and an area ration exceeding 1.75 (outlet area/inlet area). The greatest benefit will be in diffusers with area ratios between about 2.25 and 4:1, and total diversion angles between 10 and 18 degrees.

Placement of the vortex generator can be over the primary aerodynamic surface of a deflecting duct, within a diffuser, between stator blades in a turbo machine, and around mounting struts and central housings, such as bearing housings, in a turbo machine.

The mounting preferably consists of two or more U-shaped or channel-shaped elements, and extensions thereof linked so as to form a vortex generator set, with the U-shaped elements working in concert. They create a trailing vortex action by having one or more of the various surfaces of each element at an appropriate angle to oncoming flow.

The preferred aspect ratio of the legs and crosses of the "U" shaped elements is in the range of 1:4 to 4:1, depending on the desired direction of flow deflection. In general, the longer elements should be more or less perpendicular to the plane which contains the incident and deflected directions of flow.

If elements are linked side-by-side with the "legs" of the U's in contact, then the U-shaped elements will be said to function in parallel, in general producing a number of small vortices that extend widely across the aerodynamic surface. Physically, the vortex generator set forms a line cross-wise to oncoming flow and generally adjacent to and parallel to the aerodynamic surface. The parallel vortex generator set is particularly well suited for use in strong adverse pressure gradients or where boundary layers are thin to thick, but stable.

If instead the elements are linked with the tips of the legs joining the corners of the next U-shaped element and forming a stack, then the elements will be said to function in series, in general producing one or two strong, large vortices per stacked set which are confined to a downstream, comparatively narrow streak along the aerodynamic surface. With elements in series, the vortex generator set is suited for extremely strong adverse pressure gradients where flow separation is possible. In these cases, the boundary layer can be very thick and flow can be unstable. In these same cases, there is a more energetic flow a substantial distance from the aerodynamic surface. These types of flows are common in some types of turbomachines.

In the parallel sets or the series sets, one leg, both legs, and/or the cross of the "U" may be extended partially downstream and partially crosswise or parallel to the direction of flow to help guide the deflection and vortex action to where it is most useful. These extensions will be called vortex guides. If they are long, they may require additional bracing.

In general, for manufacturing ease and best structural integrity, the vortex generator sets will be made as one or more large pieces, as opposed to making the U shaped elements separately and then joining. However, the form and function is well described using the terms "U" shape, element, set, legs, guide, cross piece, series, and parallel. Two additional terms are parallel mounting frame and radial mounting frame, defined next.

For U shaped elements acting in parallel, the cross pieces of the U shaped elements are in a line, which will usually be a structural element and to which the legs are attached. This structural element will be termed the "parallel mounting frame" for the legs. This mounting strut is, as previously stated, also more or less parallel to the adjacent aerodynamic surface.

For U shaped elements acting in series, their legs will touch and be in a line, which line will usually be made as a structural element and to which the cross pieces will be attached. This long structural element will be termed the "radial mounting frame," because of its usual approximate radial orientation if installed in a turbomachine diffusing flow passage. It will normally be within 45 degrees of perpendicular to the aerodynamic surface, or, in a turbomachine, a duct or diffuser wall.

A less preferred series arrangement has only a single spine mounting for the vanes, created by deleting one leg of the "U" shaped elements, and the spine joining the crosses of the "U"'s in their mid-section or ends. This arrangement reduces drag slightly, but is less robust structurally, and the deflected gas will not penetrate as easily either through the high energy free stream gas or into a boundary layer as with the full "U" shaped elements.

BRIEF DESCRIPTION OF THE DRAWINGS

FIG. 13A is a side elevation section of a turbo machine at the beginning of a diffuser annulus illustrating a mounting placed in the high speed streamflow with vortex generators of this invention attached thereto;

FIG. 13B is a cross section taken and the diffuser mounting schematically illustrating deflections produced by the vanes;

DETAILED DESCRIPTION OF THE INVENTION

Figure 1:
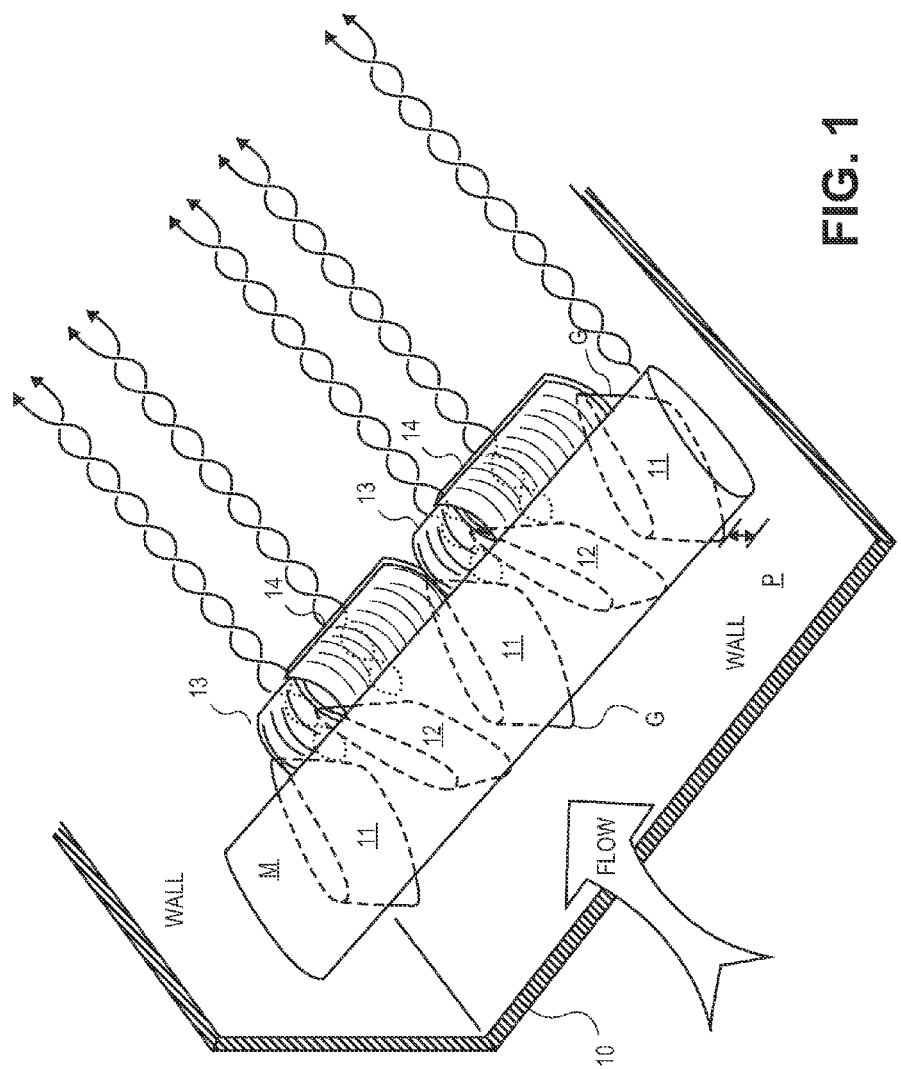
FIG. 1 is a perspective view of a vortex generator according to this invention illustrating the primary aerodynamic surface of a duct, a strut across the duct constituting the mount for the vortex generators, and oppositely inclined vortex generators extending from the strut towards (but not to the primary aerodynamic surface) illustrating deflection of gases relative to aerodynamic surface, the deflection here being alternately towards and away from the aerodynamic surface as it extends across the duct.

Referring to FIG. 1, one half of a U-shaped duct 10 constituting the primary aerodynamic surface P is shown. Utilizing this example, the reader will understand that the duct in which the gas flow is confined does not necessarily have to be a closed duct. For example the duct may be a flow diverting duct of U-shape or compressor discharge diffuser placed within the exhaust of a turbo machine.

A mounting strut M is mounted to one wall of U-shaped duct 10 and is shown extending across U-shaped duct 10. Mounting M is the surface to which vortex generators G are mounted. It is important to understand that mounting M and vortex generators G are in the free stream gas flow. Further, vortex generators G stand from the underside of mounting M and extend to and toward primary aerodynamic surface P. These vortex generators G may never reach the primary aerodynamic surface; instead they may stop short of the primary aerodynamic surface P. In this extension to and toward primary aerodynamic surface P, vortex generators G can extend into the boundary layer, although this is not preferred. The reason this extension is not preferred is that I have found that the prediction of the direction of flow of boundary layers, including any stalled gases is not possible. Boundary layer flow direction in turbomachine diffusers with struts and having efficiencies in the range of less than 70 percent is often completely unpredictable.

I prefer the vortex generator vanes to have two components. The first of these components is a vaned surface is essentially parallel to the local free stream flow. The second of these components is vanes for deflecting gas flow towards and away from the primary aerodynamic surface P. Both of these vane surfaces must act in tandem. Further, one of the vane surfaces can also be the mount.

Referring further to FIG. 1, vortex generators G are airfoil shaped and inclined with respect free stream gas flow in opposite directions with vortex generators 11 deflecting flow a way from wall of U-shaped duct 10 and vortex generators 12 deflecting flow toward wall of U-shaped duct 10. Vortex generators 11, 12 form a converging flow volume with respect to the free stream duct flow. As such, they tend to deflect the flow downwardly towards primary aerodynamic surface P. Vortex generators 12, 11 form a diverging flow volume with respect to free stream duct flow. As such, they tend to deflect the flow upwardly with respect to primary aerodynamic surface P. Both deflections relative to primary aerodynamic surface P have been found beneficial with respect to the reduction of boundary layer accumulation on primary aerodynamic surface P downstream from vortex generators 11, 12.

Optionally, further flow deflection can be provided by extensions 13, 14 to mounting M; extensions 13 deflect fluid toward the wall of duct 10; extension 14 deflects fluid away from the wall of duct 10.

As can be seen, vortices are schematically illustrated. These vortices emanate from that portion of the vanes 11, 12 which is nearest to but slightly separated from primary aerodynamic surface P. Thus, it will be understood that mount M independently supports vanes 11, 12 so that the tips of the respective vanes are just overlying primary aerodynamic surface P.

Figure 2A:
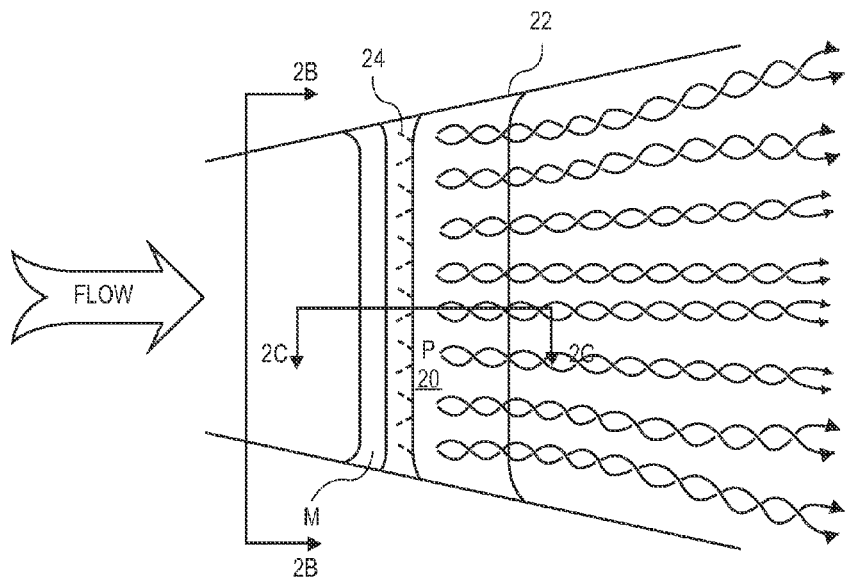
FIG. 2A is a side elevation view of the vortex generator of this invention mounted to a strut extending across a duct, the strut being provided with the vortex generators of this invention.
Figure 2B:
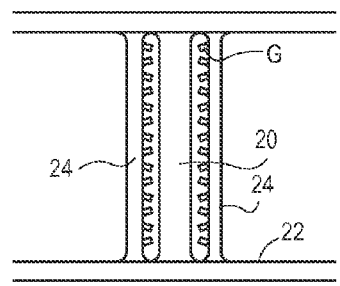
FIG. 2B is a view along lines 2B-2B of FIG. 2A looking at the vortex generator from upstream to downstream.
Figure 2C:
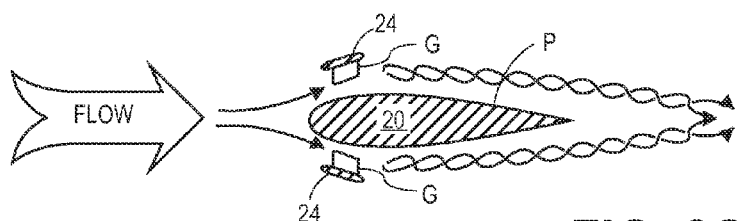
FIG. 2C is a view along lines 2C-2C of FIG. 2A looking across the strut illustrating the vortex generators in section.

Referring to FIG. 2A, strut 20 standing across annular duct 22 is shown. Strut 20 defines primary aerodynamic surface P. Overlying front edge of strut 20 is mounting M which is here shown as two smaller struts 24. Referring to FIGS. 2B and 2C, vortex generators G can be seen mounted underlying struts 24 extending to and towards primary aerodynamic surface P. It can be thus seen, that the vortex generator is suitable for mounting to struts.

Figure 3:
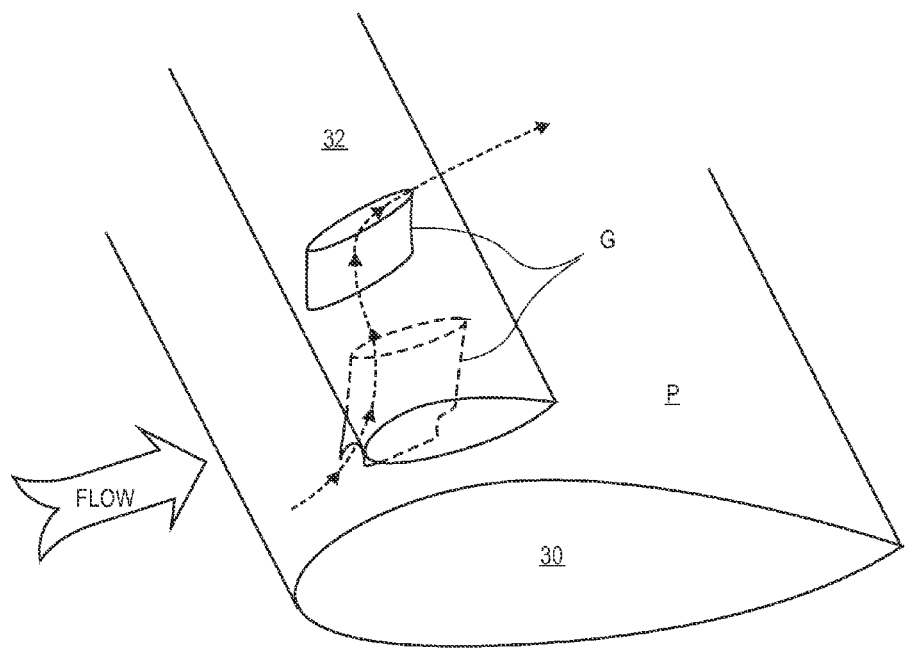
FIG. 3 is a vortex generator and mount having flow through the vortex generator from the vicinity of a aerodynamic surface through the generators of and into the free stream gas flow.

Referring to FIG. 3, an airfoil shaped strut 30 with an overlying mounting strut 32 is shown having vortex generators G mounted on either side of mounting strut 32. Here, vortex generators G are hollow to permit fluid flow from the vicinity of primary aerodynamic surface P, through mounting strut 32 to upper vortex generator G to the main free stream gas flow.

Figure 4:
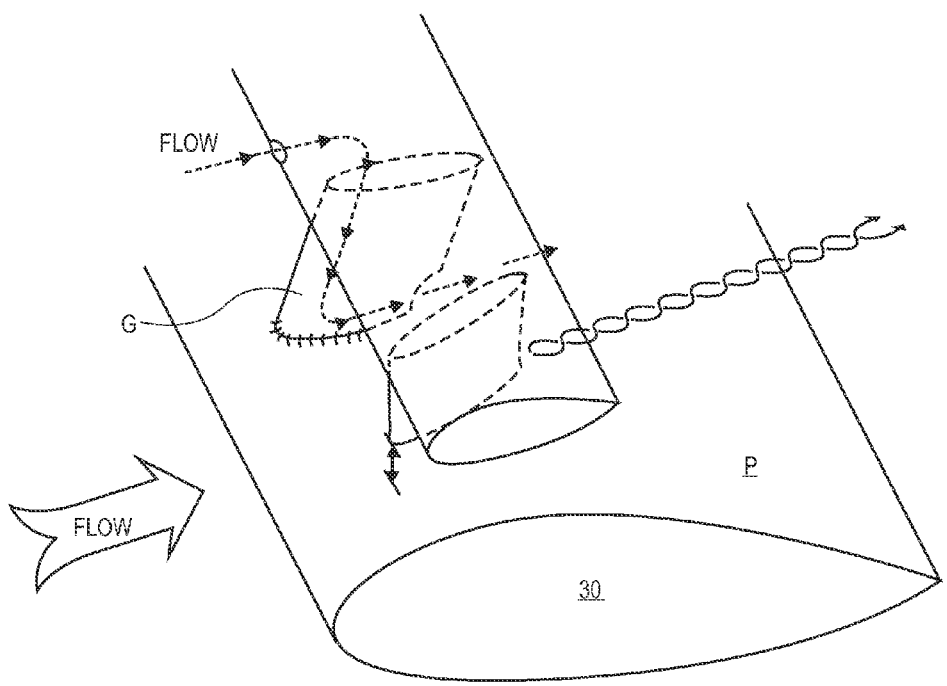
FIG. 4 is a vortex generator and mount having flow through the vortex generator from the free stream gas flow to the vicinity of the aerodynamic surface.

Referring to FIG. 4, an airfoil shaped strut 30 with an overlying mounting strut 32 is shown having underlying vortex generators G. One vortex generator is shown fastened to primary aerodynamic surface P to permit flow of free stream gas from the high speed stream to and toward primary aerodynamic surface P of strut 30. Free stream gas enters from a hole in strut 32 and exits of immediately adjacent primary aerodynamic surface P. From the views of FIGS. 3 and 4, the reader will understand that the vortex generators G can be hollowed to permit fluid flow.

The preferred direction and location of gas insertion into the free stream flow is downstream, and the preferred position is into the low pressure zone associated with the trailing vortices at the tips of vanes G. A short tube extending from the vane tip trailing corner and projecting into the vortex may be found by experiment to improve performance.

Figure 5:
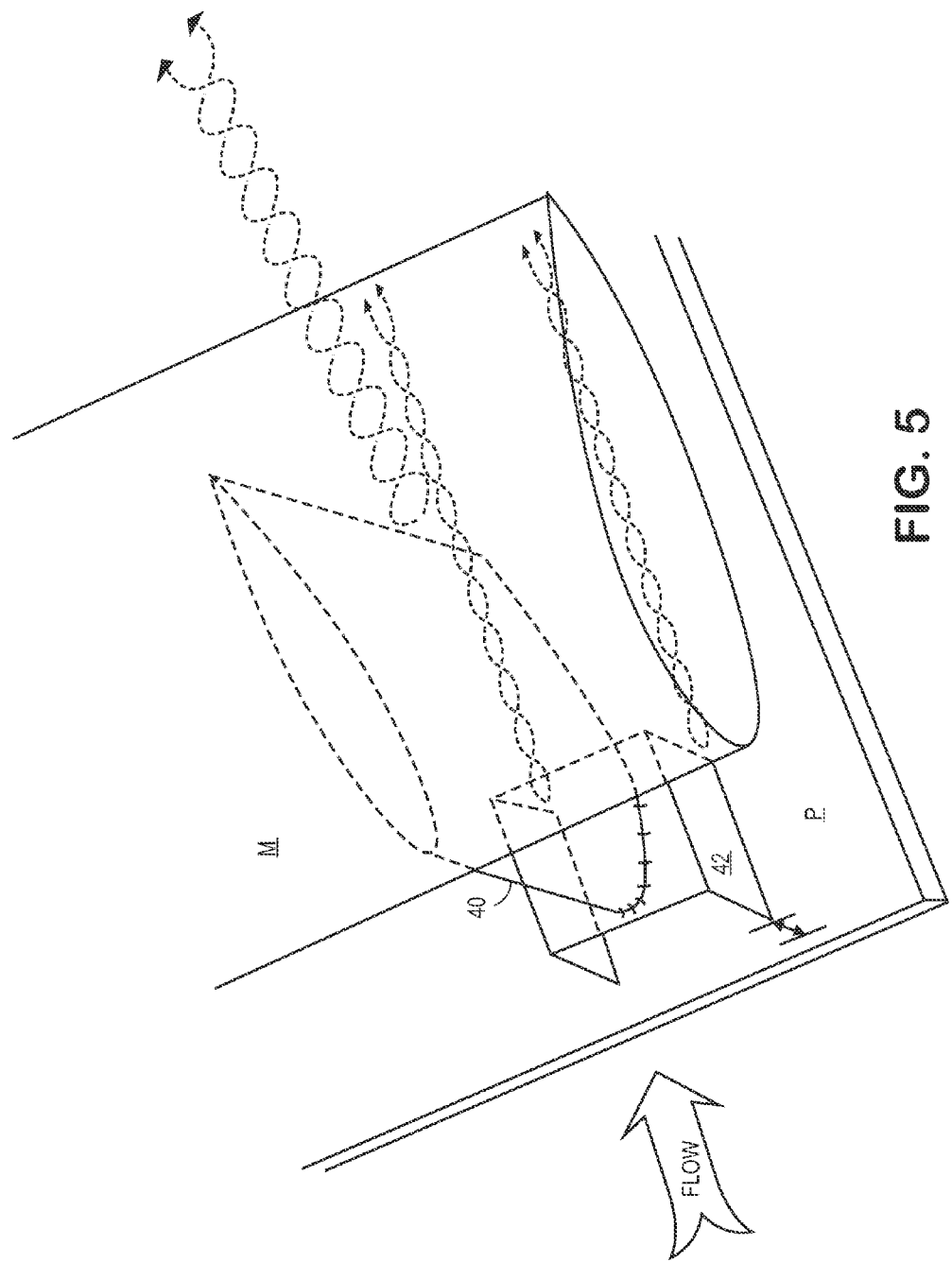
FIG. 5 is a vortex generator having first and second downwardly extending sections with the first section constituting a conventional airfoil shaped vortex generator with a smaller group of vortex generators mounted to an inverted U-shaped extension which stands partially towards but not to the aerodynamic surface.

Referring to FIG. 5, primary aerodynamic surface P is shown having a mounting M with a two-part vortex generator G depending from the mounting toward primary aerodynamic surface. The first part of the vortex generator 40 is a conventional airfoil shaped deflector. The second part of the vortex generator 42 is a U-shaped deflector depending from the end of conventional airfoil shaped deflector 40. Again, vortex generator G does not have contact with primary aerodynamic surface P.

Figure 6:
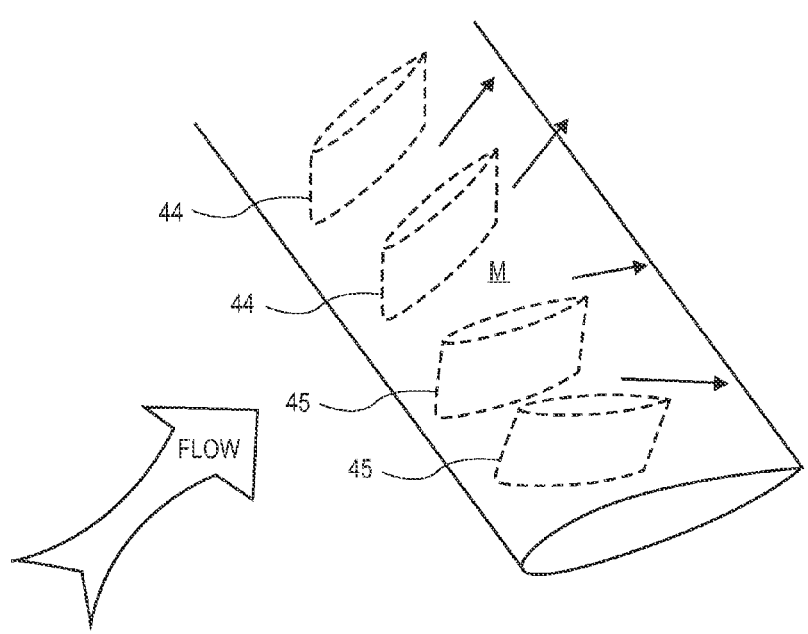
FIG. 6 is a vortex generator where respective pairs of vortex generators alternatively deflect fluid flow in the free stream.

Referring to FIG. 6, conventional airfoil shaped vortex generators 44 are shown depending from a mounting M and inclined in a first direction with respect to passing free stream gas flow. Conventional air foil shaped vortex generators 45 are shown depending from a mounting M and inclined in a second direction with respect to passing high-speed gas flow. It can be seen that the vortex generators 44, 45 can be arrayed in deflecting pairs, which deflecting pairs may or may not be parallel to one another. It will again be noted that the vortex generators as suspended from mounting M, do not come into contact with the primary aerodynamic surface P. Further, the vortices are typically generated from lowermost, protruding, and trailing portion of the respective vortex generators.

Figure 7:
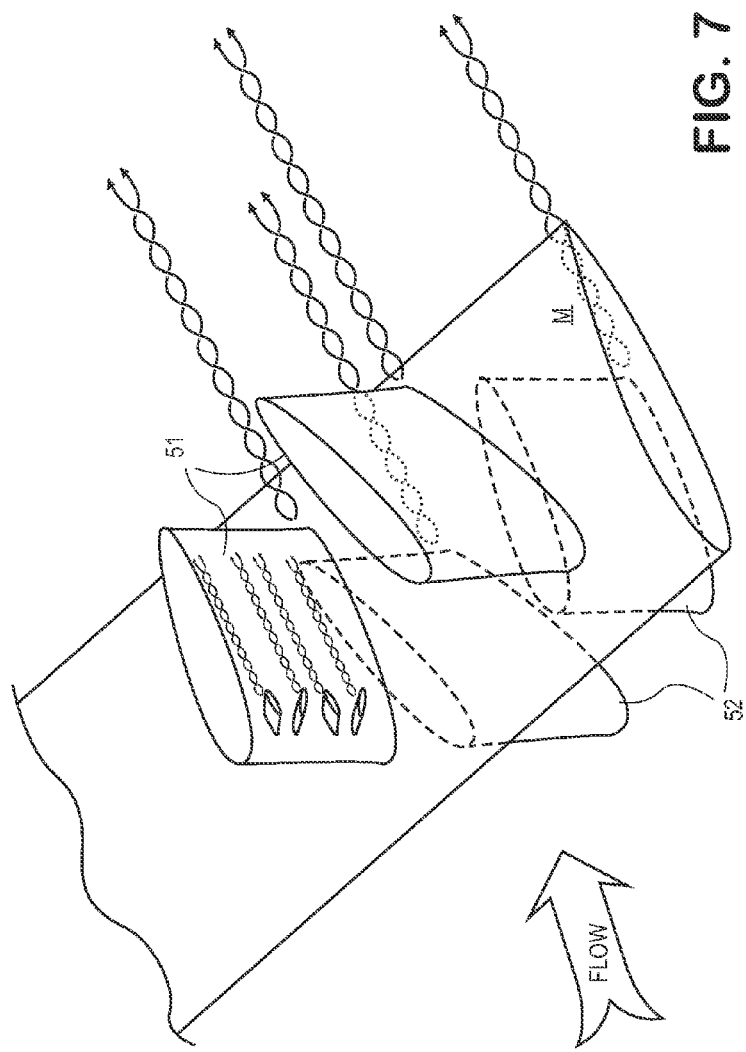
FIG. 7 is a vortex generator shown detached from the primary aerodynamic surface, the vortex generator having conventional vortex generator vanes placed on the surface of the vanes of the vortex generator.

Referring to FIG. 7, mounting M has converging vortex generators 51 mounted on the upper surface of mounting M and diverging vortex generators 52 mounted on the lower surface of mounting M. These respective converging and diverging vortex generator pairs 51, 52 can be arrayed on opposite sides of mounting M. Remembering the example of FIG. 1, it will be understood that vortex generator pairs 51 overlying vortex generator pairs 52 cause fluid in the wake of mounting M to move in the same direction. Here, converging vortex generators 51 will deflect fluid upwardly away from the wake of mounting M; diverging vortex generators 52 will deflect fluid upwardly toward the wake of mounting M. The respective overlying and underlying deflections will be complementary causing over all fluid flow to move upwardly with respect to the perspective view of FIG. 7.

It will also be understood that vanes 51 can have their own subset of vortex generators. These are shown on the leading edge of one of the vortex generators 51.

Figure 8:
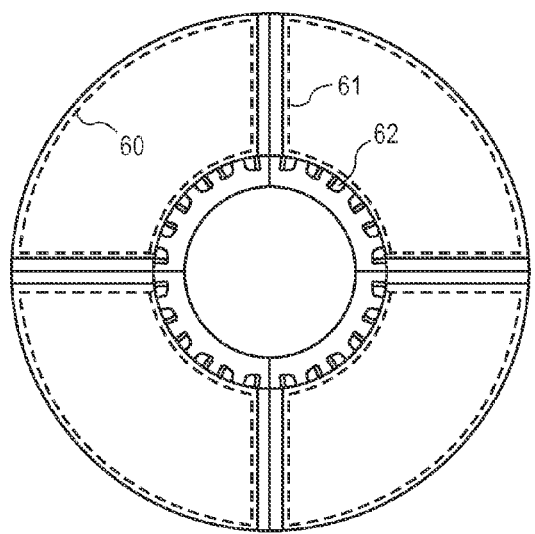
FIG. 8 is a view from the inlet, compressor portion of a turbo machine illustrating the vortex generators of this invention placed around the periphery of a confining circular duct, on struts supporting a central bearing housing from the periphery of the circular duct, and about the central bearing housing of the turbo machine.

FIG. 8 is a front view of a turbo machine illustrating the vortex generators G of this invention in three discrete locations. First, vortex generators 60 are placed about the circular periphery of the turbo machine. Second, vortex generators 61 are aligned to the struts of the turbo machine. Finally, vortex generators 62 are placed about the central bearing housing of the turbo machine. All vanes are schematically shown by broken lines.

Figure 9A:
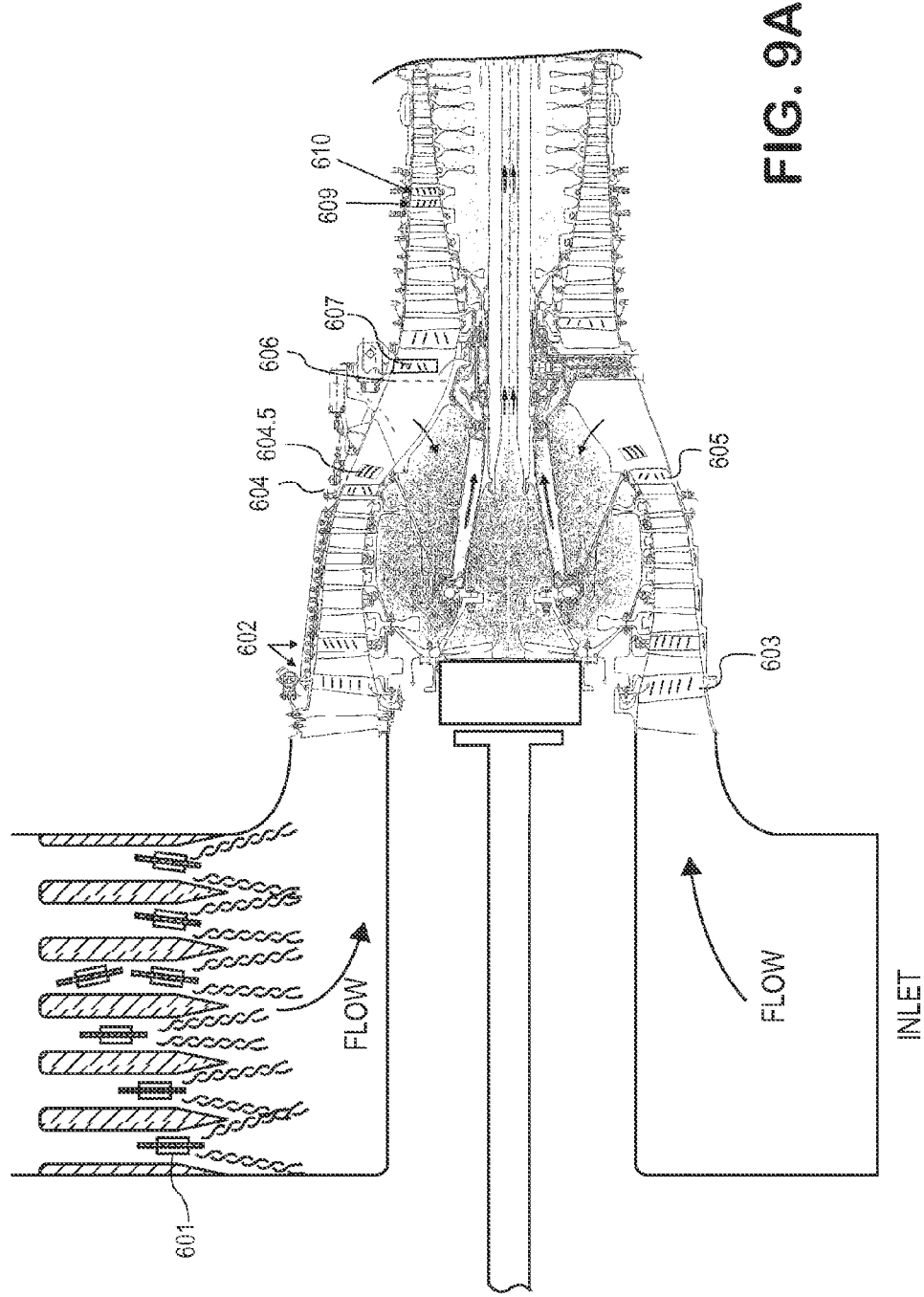
FIG. 9A and 9B are an illustration of a turbomachine downstream of FIG. 8 illustrating portions of the turbomachine where the high drag vortex generator of this invention may be placed (the drawings being labeled 9A and 9B respectively)
Figure 9B:
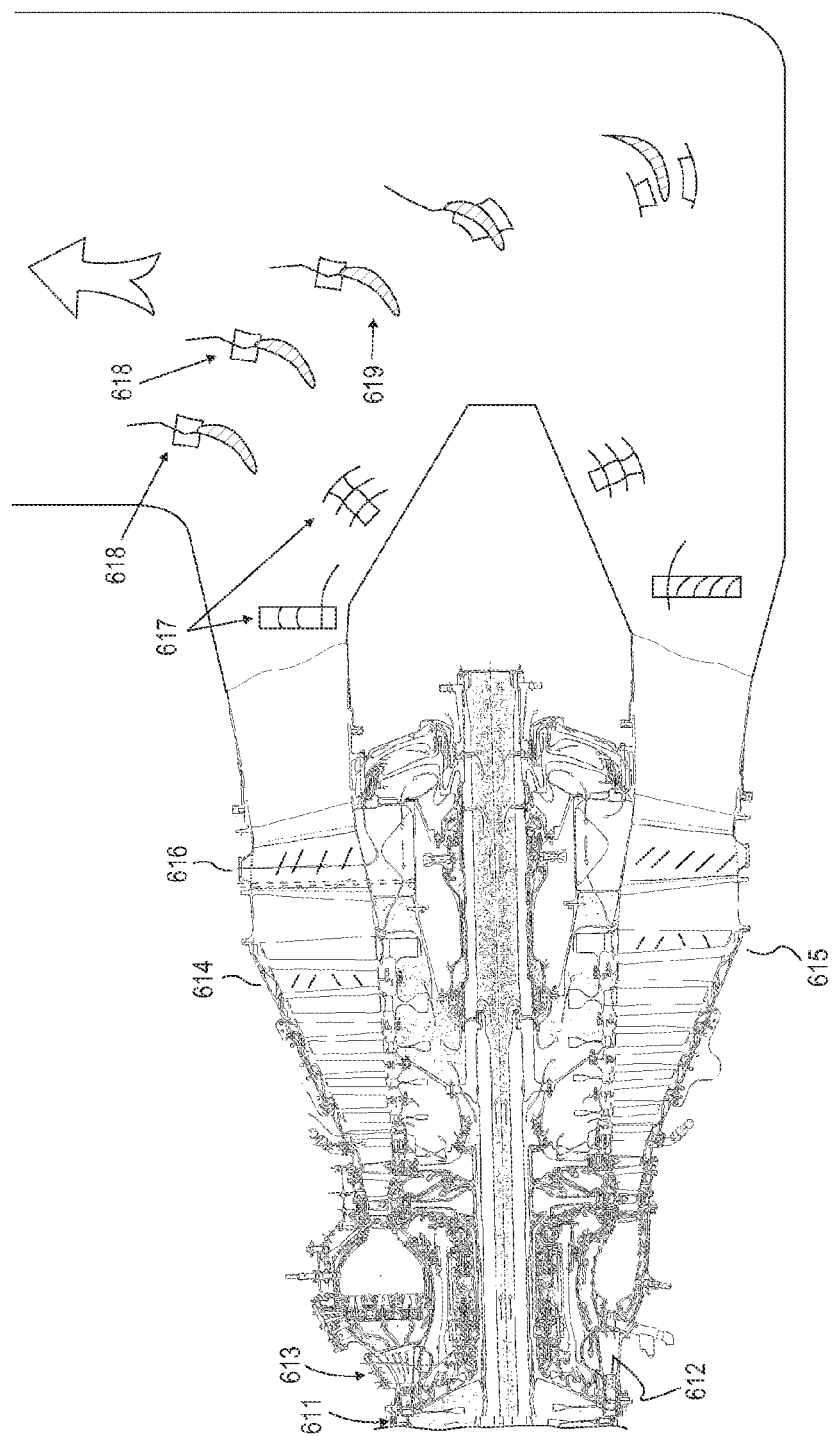

FIG. 9B is a perspective illustration of a turbomachine illustrating areas of the machine where the high drag vortex generators of this invention may be placed. Those areas are diffuser 601, the vortex generator here shown as part of a silencer on the silencer inlet; diffusing duct 602, the vortex generator here shown as a part of the compressor mounted on two stages of blades; diffusing duct 603, the vortex generator here shown mounted on two stages of stators; compressor outlet 604, the vortex generator here shown mounted on a blade row; duct bend 604.5, the vortex generator here shown directing annular segments of flow to follow the contour of the duct; compressor outlet 605, the vortex generator here shown mounted on a stator row; entrance to compressor inlet 606, the vortex generator here shown mounted in an annular flow duct; compressor inlet 607, the vortex generator here shown mounted on a blade row; compressor inlet 608, the vortex generator shown mounted on a stator row; compressor 609, the vortex generator here shown mounted on a stator row; compressor 610, the vortex generator here shown mounted on a blade row; compressor outlet 611, the vortex generator here shown mounted on a blade row; compressor outlet 612, the vortex generator here shown mounted on a turning vane or stator row; diffuser 613, the vortex generator here at the entrance to the combustor; turbine 614, the vortex generator here shown mounted on a blade row upstream of a diffuser; turbine 615, the vortex generator here shown mounted on a stator row upstream of a diffuser; exhaust diffuser 616, the vortex generator here shown mounted between struts; more or less annular diffuser 617, the vortex generator here shown guiding flow along the cone of the tapered center body; duct bend 618, the vortex generator here shown as extensions of turning vanes; and, duct bend 619, the vortex generator here shown that the leading edge in front portion of the turning vane.

Figure 11:
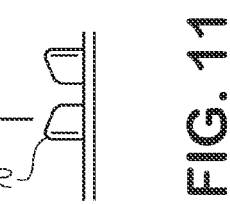

FIGS. 7A and 7B illustrate offset of vortex generators 70, 71 with respect to strut 72. In FIG. 7A vortex generators 70 is downstream the relative to strut 72 from vortex generators 71. In FIG. 11, vortex generators 70 are offset in overlying strut 72 (not shown) with respect to vortex generators 71. Mounting struts 70 and 71 can be positioned upstream of the strut 72, as well. This is true if the free stream direction is not aligned parallel to the chord of the strut.

Figure 12A:
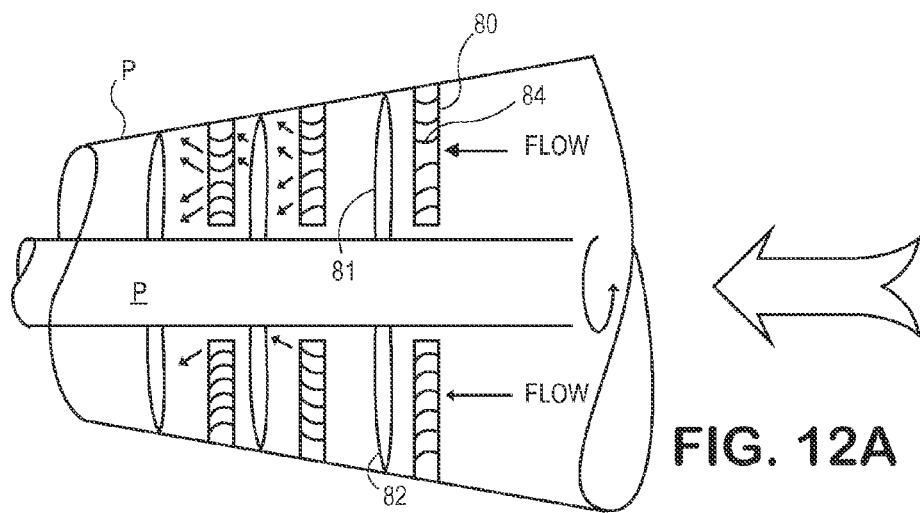
FIGS. 12A and 12B illustrate the high drag vortex generator of this invention mounted between two stator blades for preventing the formation of boundary layers in the interstitial spatial interval between the tips of rotor blades and the sidewalls of the confining duct of the turbo machine.

FIG. 12A is a perspective view of a turbo machine having rows of stator blades 80 and rotating rows of rotor blades 81 immediately behind stator blades 80. The view illustrated is immediate to the primary aerodynamic surface P which is the conical converging casing 82 of a turbo machine. Extending across the respective stator blades 80 are vortex generators 84 aligned in the high-speed gas flow in deflecting pairs. It is known that the interstitial volume between the tips of rotor blades 81 and conical diverging casing 82 of a turbo machine are areas where boundary layer gas can have particularly large consequences. By the introduction of my high drag vortex generators 84, boundary layer gas accumulation in this interstitial volume can be mitigated, albeit at the cost of losses due to varying angles of attack on the rotating blade.

Figure 12B:
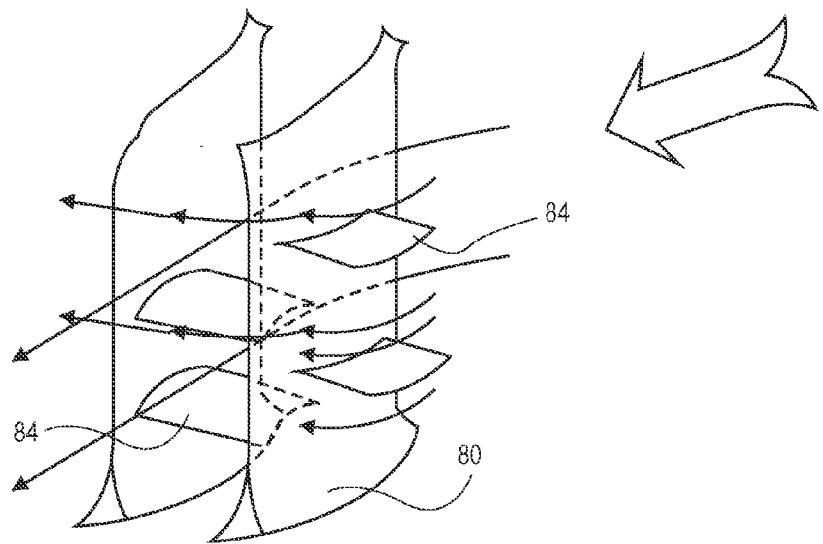

In FIG. 12B, side-by-side structure of the vortex generators 84 is illustrated. Specifically, vertical structures 80 are shown interconnected by arcuate deflecting surfaces 84. These respective surfaces 84 typically have alternating deflections of their arcuate surfaces between the vertical members 80 of the vortex generators. These arcuate shapes, properly sized, can keep the available area constant for the flow enclosed by the vanes, which reduces flow losses, especially at the intersections.

Some guidelines in the design of high drag vortex generators follow. The preferred initial design choice is high drag vortex generators acting in parallel. In an annular or round diffuser, the number of elements on a circumference may be from about five to over 50, with 12 to 24 being a good first trial, to be refined by physical or computational experiment. The available passage width, if small with respect to the circumference may dictate a higher number than otherwise would be used. The vane and mounting elements, if uncurved, may be sloped up to about 8 degrees in the direction of flow, without producing unduly large wakes. For vortex generator elements acting in series, this angle may be increased to between 8 and 10 degrees, as experiment shows to be acceptable. For vanes with curvature (camber) and substantial thickness along the direction of flow, much greater flow deflections are possible without large unstable wakes. The vane tips, as a first trial, should extend toward the aerodynamic surface about half of the distance between the mounting and the aerodynamic surface. If experiment shows that a stronger vortex action would be desired, then vortex generators in acting series, or adding more curvature for increased flow deflection may be added. This will extend the benefit of stable flow farther downstream. With the series arrangement, it may be practical to shorten or even delete the vane portions between the mounting and the aerodynamic surface, but not with the purely parallel arrangement. For annular and more or less circular or oval diffusing flow passages, it is beneficial to maintain a flow swirl angle of from about 6 to 12 degrees, with the lower swirl appropriate for low angle diffusers and for converging flow along the convergent tapering portions of center bodies in annular diffusers.

Referring to FIGS. 13A and 13B, flow annulus 90 of a turbo machine is illustrated in section. Mount M is placed about and within annulus 90 and has mounted thereto the vanes 91, 92. These vanes 91, 92 protrude from mount M toward annulus walls 94, 95 respectively. It is to be noted, that the respective vanes 91, 92 do not contact the walls. Further, adjacent vanes 91, 92 can deflect in the same direction or alternate directions, as schematically illustrated.

Typically adjacent vanes are canted in differing directions with respect to the flow through annulus 90. This produces boundary layer destroying mixing and turbulence in the wakes of fluid passage through the vortex generators. However, it may be found by experiment that having two or three adjacent vanes deflecting flow in one direction, and then two or three vanes deflecting flow in another direction may produce better results.

Figure 13C:
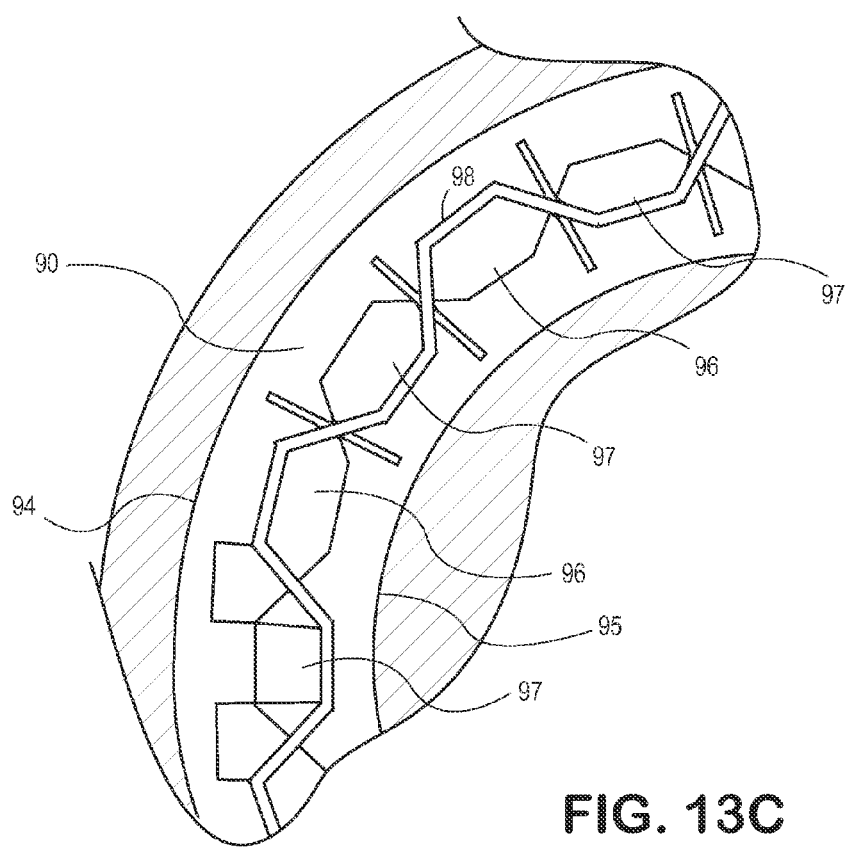
FIG. 13C is an expanded cross-sections similar to FIG. 13*b* illustrating a diffuser with an annular disposition within the beginning of the diffuser annulus, this diffuser being provided with numerous vertical vanes to prevent sideways displacement of high-speed gas flow.

Referring to FIG. 13C, a variation of this vortex generator is shown. Specifically, metal strip 98 is formed as a continuum and mounted interior of the turbo machine diffuser 90. Respective sections of metal strip 98 are bent in different deflecting directions with portions 96 deflecting fluid flow towards inner wall 95 and portions 97 deflecting fluid flow towards outer walls 94. Mounting of the vortex generator occurs at mounts 99 fastened here to inner annulus walls 95. In practice, the strip would have smooth curves for flow efficiency, rather than the angular construction necessary for illustration understanding shown in the drawings.

Figure 10:
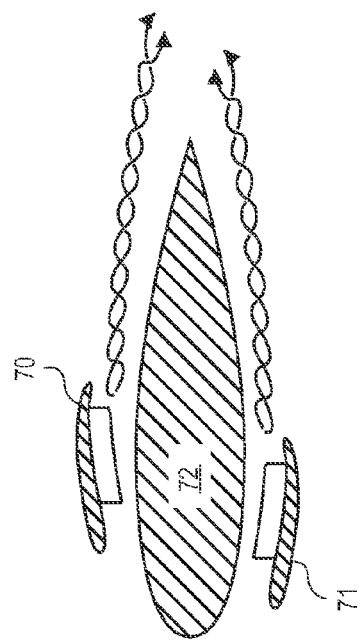
FIGS. 10 and 11 illustrate offset overlying and underlying vortex generators with respect to a strut standing across a turbo machine.
Figure 14B:
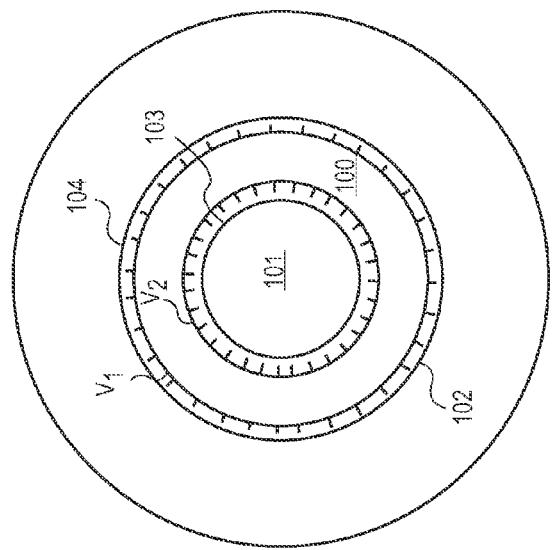
FIG. 14B is view of the diffuser of FIG. 14*a* taken along lines 10*b*—10*b* of FIG. 14*a*.
Figure 14A:
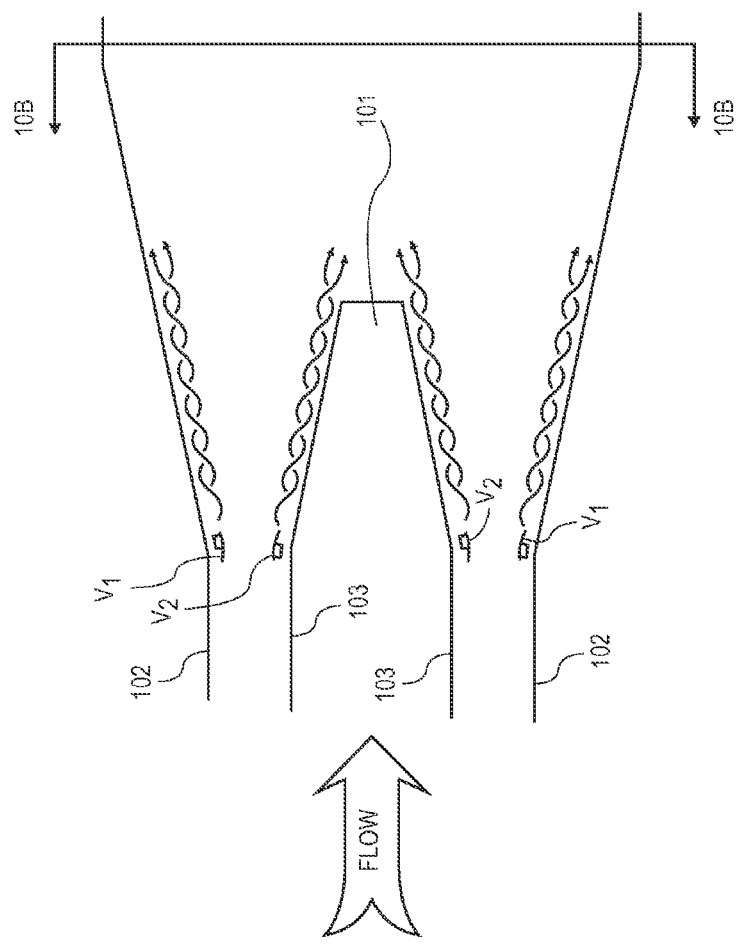
FIG. 14A is a side elevation taken at the diffuser end of a turbo machine illustrating placements of the vortex generator of this invention at the terminus of the flow annulus and the beginning of the conventional diffuser.

Referring to FIGS. 14A and 10B, placement of the annulus vortex generators in pairs is illustrated. FIG. 10A illustrates in section the exhaust of a turbo machine. Flow annulus 100 terminates at turbo machine inner housing 101. Vortex generators V1 and V2 are placed around outer annulus surface 102 and inner annulus surface 103, respectively. As illustrated in the side elevation of FIG. 14A, boundary layer accumulation downstream of the annulus 100 is presented by mixing caused by the vortices.

Figure 15:
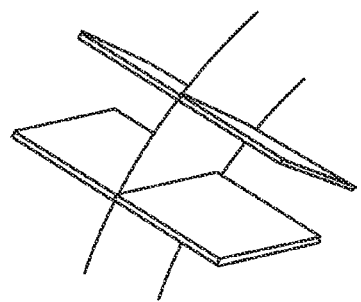
FIG. 15 through 18 are various embodiments of vortex generators having U-shaped configurations.
Figure 16:
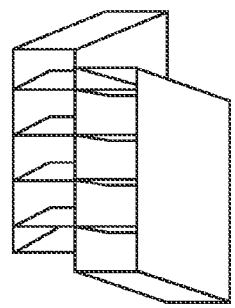

Referring to FIG. 15, an annularly arrayed vortex generator is illustrated. Specifically, radially arrayed (or vertically arrayed) vertical members 110 are connected by respective upwardly deflecting members 111 and downward deflecting members 112. In the preferred embodiments here shown, upwardly deflecting members 111 alternate between downwardly deflecting members 112 to produce alternating deflections.

Referring to 11B, square arrays 113, 114 are shown having respective parallel deflecting surfaces inclined at 30 degrees with respect to the direction of fluid flow. The axis of fluid flow bifurcates the general deflection of arrays 113, 114. Thus square arrays 113 will deflect the fluid upwardly while square arrays 114 will deflect the fluid downwardly.

Figure 17:
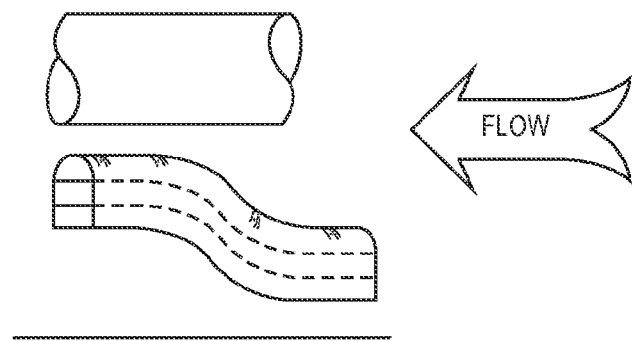

Referring to FIG. 17, a vortex generators such as that found near the outlet of a compressor is illustrated. Specifically, a compressor will have high-speed flow adjacent the outer annulus of a turbo machine. The vortex generator 115 here illustrated, deflects high-speed gas flow from near the exterior surface of the turbo machine annulus and channels that high-speed gas flow adjacent the inner annular surface, energizing the boundary layers near the shafting and shaft covers of the turbo machine.

Figure 18:
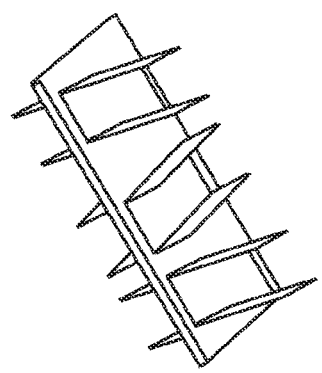

Referring to FIG. 18, paired series of vanes 116, 117 are shown on opposite sides of a single vertical member 118. The respective vanes are canted at 30 degrees one with respect to another. At the same time, fluid flow is incident upon the vanes at angles of 15 degrees. Thus, one said of vanes 116 will deflect the flow upwardly; the other set of vanes 117 will deflect the flow downwardly.

It will be understood that the illustrations of FIGS. 15-18 are all exemplary. Numerous other deflecting shapes will work as well. What is needed is the first vane flow confining components for deflecting fluid flow from the high speed gas flow towards and/or away from the primary aerodynamic surface. The second vane flow confining components for maintaining the deflected free stream fluid flow along a path towards and/or away from the primary aerodynamic surface. It is designed to avoid, or at least control flow gas motion parallel to the primary aerodynamic surface. Thus, control is attained by the vertically extending or radially extending second main flow confining components. This has the result that boundary layer formation downstream from the vortex generator is inhibited by mixing of the high speed free stream gas flow into the volume adjacent the primary aerodynamic surface where the boundary layers might otherwise thicken excessively.

Figure 19A:
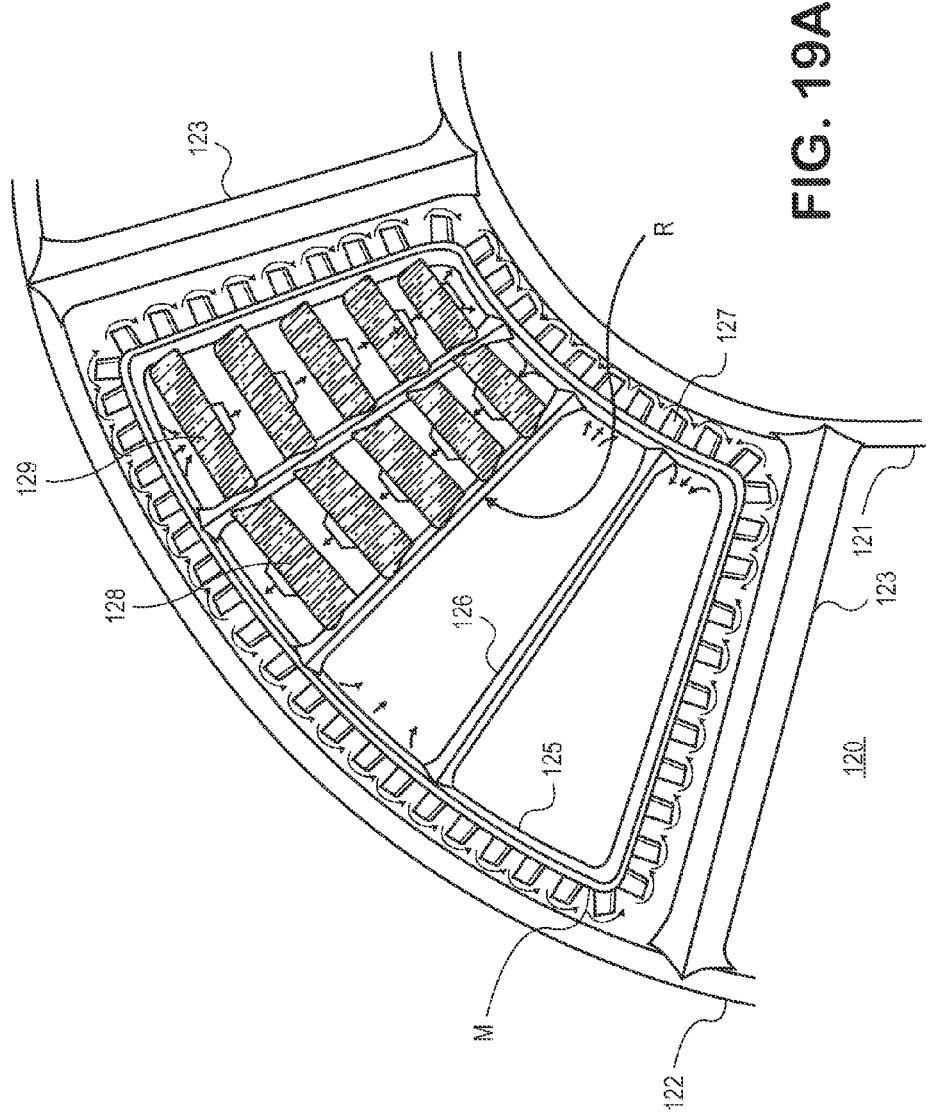
FIG. 19A is a view of the beginning of a diffuser in a turbo machine illustrating the high drag vortex generators of this invention placed between structural struts in a grid like array; and, FIG. 19B is a section taken across a diffuser similar to that shown in FIG. 19a one immediately behind a moving blade row in a turbo machine.
Figure 19B:
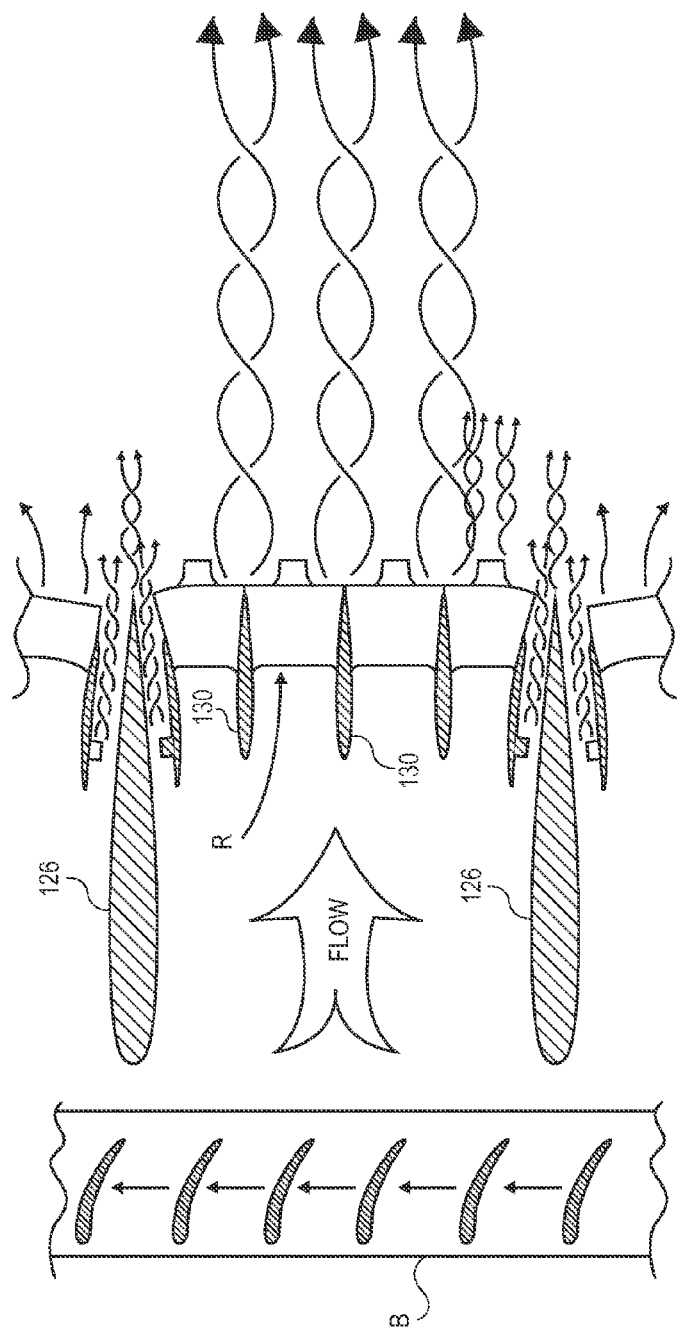

Referring to FIG. 19a, a turbine annulus 120 has inner wall 121 spatially separated from outer wall 122 by respective struts 123, these respective struts 123 being placed at intervals around annulus 120. Into the interstitial volume defined between respective inner wall 121 and outer walls 122 there are placed vortex generator grids R. These vortex generator grids include mount M which here is a grid having circumferential components 125 and radial components 126. On the exterior of mount deflection vanes 127 protrude toward inner wall 121, struts 123 and outer wall 122. Interior of the respective grids there are placed deflection vanes 128 for supplying gas flow deflection towards outer wall 122 and deflection vanes 129 for supplying gas flow deflection towards inner wall 121.

Referring to FIG. 12B, the placement of vortex generator grid R one immediately behind moving blade row B is illustrated.

Vanes 130 having differing degrees of deflection of the main gas flow stream are mounted so as to prevent the accumulation of boundary layer and/or stall gas downstream of the moving blade row B.

What is claimed is:

1. In a duct having a strong adverse pressure gradient with high speed gas flow over a primary aerodynamic surface for confining the high speed gas flow, an apparatus for inhibiting a formation of boundary layer gas flow comprising:
   a mounting for supporting a high drag vortex generator above the primary aerodynamic surface confining gas flow;
   a high drag vortex generator supported from the mounting and extending from the mounting into the high speed gas flow, the high drag vortex generator extending from the mounting equal to or less than the full distance to the primary aerodynamic surface and including one or more first vanes and a plurality of second vanes;
   the first vanes having first flow confining components;
   the second vanes having second flow confining components at substantial right angles with respect to the first flow confining components of the first vanes;
   the first vane flow confining components for deflecting fluid flow from the high speed gas flow towards and/or away from the primary aerodynamic surface;
   the second vane flow confining components for maintaining the deflected fluid flow along a path towards and/or away from the primary aerodynamic surface, the first and second vanes forming one or more U-shaped elements with the second vanes forming the legs of each U-shaped element;
   whereby boundary layer formation downstream from the vortex generator is inhibited by mixture of the high speed gas flow into the volume adjacent the primary aerodynamic surface where the boundary layers might otherwise form.

2. The vortex generator of claim 1 and wherein:
the mounting and at least one of the first vanes are the same.

3. The vortex generator of claim 1 and wherein:
the mounting is separate from the vanes.

4. The vortex generator of claim 1 and wherein:
the mounting is attached to the primary aerodynamic surface.

5. The vortex generator of claim 1 and wherein:
the vortex generator for deflecting fluid flow includes converging side-by-side second vanes.

6. The vortex generator of claim 1 and wherein:
the vortex generator for deflecting fluid flow includes diverging side-by-side second vanes.

7. The vortex generator of claim 1 and wherein:
the vortex generator deflects fluid flow away from the primary aerodynamic surface.

8. The vortex generator of claim 1 and wherein:
the vortex generator deflects fluid flow towards the primary aerodynamic surface.

9. The vortex generator of claim 1 and wherein:
the vortex generator for deflecting fluid flow includes side-by-side vanes deflecting gas in a same direction relative to the high speed gas flow.

10. The vortex generator of claim 1, wherein the high drag vortex generator includes a plurality of first vanes, and wherein the first and second vanes form a plurality of U-shaped elements with the second vanes forming the legs of each U-shaped element, and wherein the plurality of U-shaped element are parallel to each other.

11. The vortex generator of claim 1, wherein the first and/or the second flow confining components have arcuate surfaces, thereby providing confined flow passages having constant flow area.

12. The vortex generator of claim 1, wherein the distance between the high drag vortex generator and the primary aerodynamic surface is greater than zero and less than half of the distance between the mounting and the primary aerodynamic surface.

13. The vortex generator of claim 1, wherein the second vanes are attached to the primary aerodynamic surface.

14. A turbo machine including in combination:
a duct having a strong adverse pressure gradient with high speed gas flow over a primary aerodynamic surface for confining the high speed gas flow;
a high drag vortex generator for inhibiting the formation of boundary layer gas flow comprising:
a mounting for supporting the high drag vortex generator at a spatial interval in the high speed gas flow above the primary aerodynamic surface confining duct flow;
a high drag vortex generator supported from the mounting and extending from the mounting into the high speed gas flow, the high drag vortex generator extending from the mounting equal to or less than the full distance to the primary aerodynamic surface confining diffuser flow and including one or more first vanes and a plurality of second vanes;
the first vanes having first flow confining components;
the second vanes having second flow confining components at substantial right angles with respect to the first flow confining components of the first vanes;
the first vane flow confining components for deflecting fluid flow from the high speed gas flow towards and/or away from the primary aerodynamic surface;
the second vane flow confining components for maintaining the deflected fluid flow along a path towards and/or away from the primary aerodynamic surface, the first and second vanes forming one or more U-shaped elements with the second vanes forming the legs of each U-shaped element;
whereby boundary layer formation downstream from the vortex generator is inhibited by mixture of the high speed gas flow into the volume adjacent the primary aerodynamic surface where the boundary layers might otherwise form.

15. The turbo machine according to claim 14 and wherein:
the primary aerodynamic surface is the peripheral housing of a turbo machine diffuser.

16. The turbo machine according to claim 14 and wherein:
the primary aerodynamic surface is the central bearing housing of a turbo machine.

17. The turbo machine according to claim 14 and wherein:
the high drag vortex generator is mounted within the constriction of the diffuser.

18. The turbo machine according to claim 14 and wherein:
the primary aerodynamic surface is an airfoil shaped strut spanning across a turbo machine diffuser;
the mounting is adjacent a leading edge of the airfoil shaped strut; and
the high drag vortex generator is mounted adjacent the leading edge of the airfoil shaped strut.

19. The turbo machine according to claim 18 and wherein:
the mounting is on both sides of the leading-edge of the airfoil shaped strut; and
the high drag vortex generator is mounted on both sides of the leading half of the airfoil shaped strut.

20. The turbo machine according to claim 18 and wherein:
the high drag vortex generator mounted on one side the leading edge of the airfoil shaped strut deflects gas flow away from the strut in the first direction; and
the high drag vortex generator mounted on the other side the leading edge of the airfoil shaped strut deflects gas flow away from the strut in the same first direction.

21. A turbo machine comprising:
a duct forming a confining diffuser annulus with downstream flow having a strong adverse pressure gradient with high speed gas flow between inside annulus surfaces and outside annulus surfaces for confining the high speed gas flow within the diffuser annulus;
a high drag vortex generator for inhibiting the formation of boundary layer gas flow within the duct mounted continuously around the diffuser annulus;
a mounting for supporting the high drag vortex generator at a spatial interval in the high speed gas flow above the primary aerodynamic surface confining duct flow mounted continuously around the diffuser annulus;
a series of high drag vortex generators including the high drag vortex generator supported from the mounting and extending from the mounting in the high speed gas flow, the series of high drag vortex generators extending from the mounting equal to or less than the full distance to the primary aerodynamic surface confining diffuser flow and including a plurality of first vanes and a plurality of second vanes;
the first vanes having first flow confining components;
the second vanes having second flow confining components at substantial right angles with respect to the first flow confining components of the first vanes;
the first vane flow confining components for deflecting fluid flow from the high speed gas flow towards and/or away from the primary aerodynamic surface;
the second vane flow confining components for maintaining the deflected fluid flow along a path towards and/or away from the primary aerodynamic surface, the first and second vanes forming a plurality of U-shaped elements with the second vanes forming the legs of each U-shaped element;
whereby boundary layer formation downstream from the vortex generator is inhibited by mixture of the high speed gas flow into the volume adjacent the primary aerodynamic surface where the boundary layers might otherwise form.

22. In duct having a strong adverse pressure gradient with high speed gas flow over a primary aerodynamic surface for confining the high speed gas flow, a high drag vortex generator for inhibiting the formation of boundary layer gas flow comprising:
a mounting for supporting the high drag vortex generator at a spatial interval in the high speed gas flow above the primary aerodynamic surface confining duct flow;
a support for the mounting extending from the duct to maintain the mounting within the high speed gas flow above the primary aerodynamic surface confining the duct flow;

a U-shaped high drag vortex generator supported from the mounting and extending from the mounting in the high speed gas flow, the high drag vortex generator extending from the mounting equal to or less than the full distance to the primary aerodynamic surface confining diffuser flow and including a first vane and two second vanes;

the first vane forming a first part of the U-shaped high drag vortex generator having first flow confining components;

the second vanes forming a second part of the U-shaped high drag vortex generator having second flow confining components at substantial right angles with respect to the first flow confining components of the first vane;

the first vane flow confining components for deflecting fluid flow from the high speed gas flow towards and/or away from the primary aerodynamic surface;

the second vane flow confining components for maintaining the deflected fluid flow along a path towards and/or away from the primary aerodynamic surface;

whereby boundary layer formation downstream from the vortex generator is inhibited by mixture of the high speed gas flow into the volume adjacent the primary aerodynamic surface where the boundary layers might otherwise form.

23. In a duct within a silencer having a strong adverse pressure gradient with gas flow over a primary aerodynamic surface for confining the high speed gas flow, an apparatus for inhibiting the formation of boundary layer gas flow comprising:

a mounting for supporting a high drag vortex generator above the primary aerodynamic surface confining duct flow;

a high drag vortex generator supported from the mounting and extending from the mounting into the high speed gas flow, the high drag vortex generator extending from the mounting equal to or less than the full distance to the primary aerodynamic surface and including one or more first vanes and a plurality of second vanes;

the first vanes having first flow confining components;

the second vanes having second flow confining components at substantial right angles with respect to the first flow confining components of the first vanes;

the first vane flow confining components for deflecting fluid flow from the high speed gas flow towards and/or away from the primary aerodynamic surface; and the second vane flow confining components for assisting in deflecting fluid flow, and for maintaining the deflected fluid flow along a path towards and/or away from the primary aerodynamic surface, the first and second vanes forming one or more U-shaped elements with the second vanes forming the legs of each U-shaped element;

whereby boundary layer formation downstream from the vortex generator is inhibited by mixture of the high speed gas flow into the volume adjacent the primary aerodynamic surface where the boundary layers might otherwise form.

* * * * *